(12) United States Patent
Martin et al.

(10) Patent No.: US 11,453,353 B2
(45) Date of Patent: Sep. 27, 2022

(54) HIGH TEMPERATURE HEAT SHIELD FOR A TAIL GATE

(71) Applicant: Honda Motor Co., Ltd., Tokyo (JP)

(72) Inventors: Jason L. Martin, Dublin, OH (US);
Troy A. Kalina, Ostrander, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 314 days.

(21) Appl. No.: 16/670,265

(22) Filed: Oct. 31, 2019

(65) Prior Publication Data

US 2021/0129771 A1   May 6, 2021

(51) Int. Cl.
*B62D 33/027* (2006.01)
*B62D 33/03* (2006.01)
*B60R 13/08* (2006.01)
*B60P 1/28* (2006.01)

(52) U.S. Cl.
CPC .......... *B60R 13/0876* (2013.01); *B60P 1/28* (2013.01); *B62D 33/0273* (2013.01); *B62D 33/03* (2013.01)

(58) Field of Classification Search
CPC .............. B62D 33/0273; B62D 33/03; B62D 33/0023; B62D 33/027; B60J 11/06; B60R 13/0815; B60R 13/04; B60R 13/0876
USPC ................................................ D12/196, 401
See application file for complete search history.

(56) References Cited

U.S. PATENT DOCUMENTS

| | | | | |
|---|---|---|---|---|
| 4,968,084 A | * | 11/1990 | Asher | ..................... B60R 13/00 280/770 |
| 5,169,201 A | * | 12/1992 | Gower | ..................... B60R 13/01 296/39.2 |
| 5,312,145 A | * | 5/1994 | McNeil | ..................... B60J 11/06 29/428 |
| 5,372,397 A | * | 12/1994 | Arndt | ..................... B60R 13/01 296/39.2 |
| 5,726,398 A | | 3/1998 | Zahn et al. | |
| 6,017,079 A | * | 1/2000 | Warner | ..................... B60R 13/04 118/505 |
| 6,572,723 B1 | | 6/2003 | Tilton et al. | |
| 6,595,575 B2 | * | 7/2003 | Morris | ..................... B60R 13/04 280/770 |
| 7,118,153 B2 | * | 10/2006 | Kitayama | .......... B62D 33/0273 296/57.1 |

(Continued)

FOREIGN PATENT DOCUMENTS

| | | |
|---|---|---|
| DE | 102012013876 A1 | 3/2013 |
| DE | 202019101230 U1 | 3/2019 |

(Continued)

OTHER PUBLICATIONS

Borla exhaust system fora 2004-2008 Ford F150 (Year: 2008).*

*Primary Examiner* — Gregory A Blankenship

(74) *Attorney, Agent, or Firm* — Plumsea Law Group, LLC

(57) ABSTRACT

A tail gate for a vehicle cargo bed includes a tail gate body having an interior surface disposed towards the vehicle cargo bed and an exterior surface disposed outwards from the vehicle cargo bed; and a heat shield secured to the exterior surface of the tail gate body. At least a portion of the tail gate body is constructed from a first material having a first melting temperature and the heat shield is constructed from a second material having a second melting temperature. The second melting temperature is greater than the first melting temperature.

19 Claims, 6 Drawing Sheets

(56) References Cited

U.S. PATENT DOCUMENTS

| | | | |
|---|---|---|---|
| 8,220,855 B2* | 7/2012 | Nakamura | E05B 83/16 |
| | | | 296/56 |
| 9,067,482 B1* | 6/2015 | Ferlinghetti | B60J 11/06 |
| 9,227,675 B1* | 1/2016 | Elquest | B60P 1/64 |
| 9,481,402 B1* | 11/2016 | Muto | B60Q 1/263 |
| 9,623,803 B1* | 4/2017 | Martins | B62D 33/0273 |
| 9,776,481 B2 | 10/2017 | Deckard et al. | |
| 9,810,117 B2 | 11/2017 | Hiraoka et al. | |
| 10,022,016 B1 | 7/2018 | Streett et al. | |
| 11,066,111 B2* | 7/2021 | Stojkovic | B62D 33/0273 |
| 2002/0135202 A1* | 9/2002 | Rokahr | B62D 33/0273 |
| | | | 296/136.07 |
| 2004/0041429 A1* | 3/2004 | McLaren | B62D 29/002 |
| | | | 296/57.1 |
| 2006/0214449 A1* | 9/2006 | Klusmeier | B62D 33/0273 |
| | | | 296/26.11 |
| 2007/0090662 A1* | 4/2007 | Katterloher | B62D 33/023 |
| | | | 296/57.1 |
| 2007/0216195 A1* | 9/2007 | Furman | B60P 1/26 |
| | | | 296/183.1 |
| 2009/0195048 A1* | 8/2009 | Shimamura | B62D 33/0273 |
| | | | 298/12 |
| 2010/0007169 A1* | 1/2010 | Nguyen | B60J 11/06 |
| | | | 296/136.07 |
| 2011/0148135 A1* | 6/2011 | Kanazawa | B60P 1/28 |
| | | | 296/26.1 |
| 2012/0159857 A1* | 6/2012 | Kaplan | B62D 33/0273 |
| | | | 49/465 |
| 2013/0316102 A1 | 11/2013 | Yoshida | |
| 2017/0158254 A1* | 6/2017 | Singer | B62D 33/08 |
| 2018/0178858 A1* | 6/2018 | Hollman | B60N 2/005 |
| 2018/0290527 A1* | 10/2018 | Marchlewski | B60J 10/86 |
| 2018/0326836 A1 | 11/2018 | Weiss | |
| 2020/0148283 A1* | 5/2020 | Robinson | B62D 33/03 |
| 2021/0129771 A1* | 5/2021 | Martin | B60R 13/0876 |

FOREIGN PATENT DOCUMENTS

| | | |
|---|---|---|
| EP | 2072775 A1 | 6/2009 |
| FR | 3064956 A1 | 10/2018 |
| KR | 19990018476 A | 3/1999 |

* cited by examiner

HIGH TEMPERATURE HEAT SHIELD FOR A TAIL GATE

BACKGROUND

1. Field of the Disclosure

The present disclosure relates to a heat shield for a tail gate, and more particularly, to a heat shield for the tail gate of a cargo bed in a dump vehicle.

2. Description of Related Art

In a conventional utility vehicle, the cargo bed is often a "dump-type" bed meaning that the cargo bed may be rotated or tilted upwards in order to empty the contents of the bed. When the cargo bed is tilted upwards in the dump position, the tail gate is also in the open position such that the contents within the bed may be easily emptied. This can be problematic, however, because in the dump position with the tail gate open, the tail gate may be placed in close proximity to the high temperature of the exhaust tail pipe or muffler. For tail gates made from a plastic material with a low melting temperature, such as, for example, high density polyethylene, this can result in inadvertent melting of the tail gate.

There is thus a need in the art for a system and method that addresses the potential for melting damage to the tail gate as discussed above.

SUMMARY

A thermal insulating plate or heat shield is located on the exterior of the dumping cargo bed of a vehicle and positioned such that it provides an insulation barrier between a heated tailpipe and/or muffler and the tailgate of the cargo bed when the cargo bed is tipped upward and the tailgate is open, thereby preventing damage to the tailgate.

In one aspect, the disclosure provides a tail gate for a vehicle cargo bed including a tail gate body having an interior surface disposed towards the vehicle cargo bed and an exterior surface disposed outwards from the vehicle cargo bed, and a heat shield secured to the exterior surface of the tail gate body, wherein at least a portion of the tail gate body is constructed from a first material having a first melting temperature, the heat shield is constructed from a second material having a second melting temperature, and the second melting temperature is greater than the first melting temperature.

In another aspect, a tail gate is configured for use on a dumping cargo bed of a utility vehicle, the utility vehicle having a body frame, a passenger area, and an exhaust system outlet, the dumping cargo bed configured to have a normal position and a dump position and the tail gate configured to have a closed position and an open position. The tail gate includes a tail gate body having an interior surface disposed towards the passenger area and an exterior surface disposed outwards from the dumping cargo bed, and a heat shield disposed on the exterior surface of the tail gate body, wherein, when the cargo bed is in the dump position and the tail gate is in the open position, a portion of the tail gate body is proximal the exhaust system outlet, the heat shield being disposed on said portion of the tail gate body that is proximal to the exhaust system outlet.

A still further aspect of the disclosure provides a dumping cargo bed for a utility vehicle having a bottom surface, a front wall, opposing side walls, and a rear wall being disposed substantially perpendicular and upward from a periphery of the bottom surface. The rear wall includes a tail gate having an interior surface disposed towards the front wall and an exterior surface disposed outwards from the dumping cargo bed, and a heat shield is disposed on the exterior surface of the tail gate. At least a portion the tail gate is constructed from a first material having a first melting temperature, the heat shield is constructed from a second material having a second melting temperature, and the second melting temperature is higher than the first melting temperature.

Other systems, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
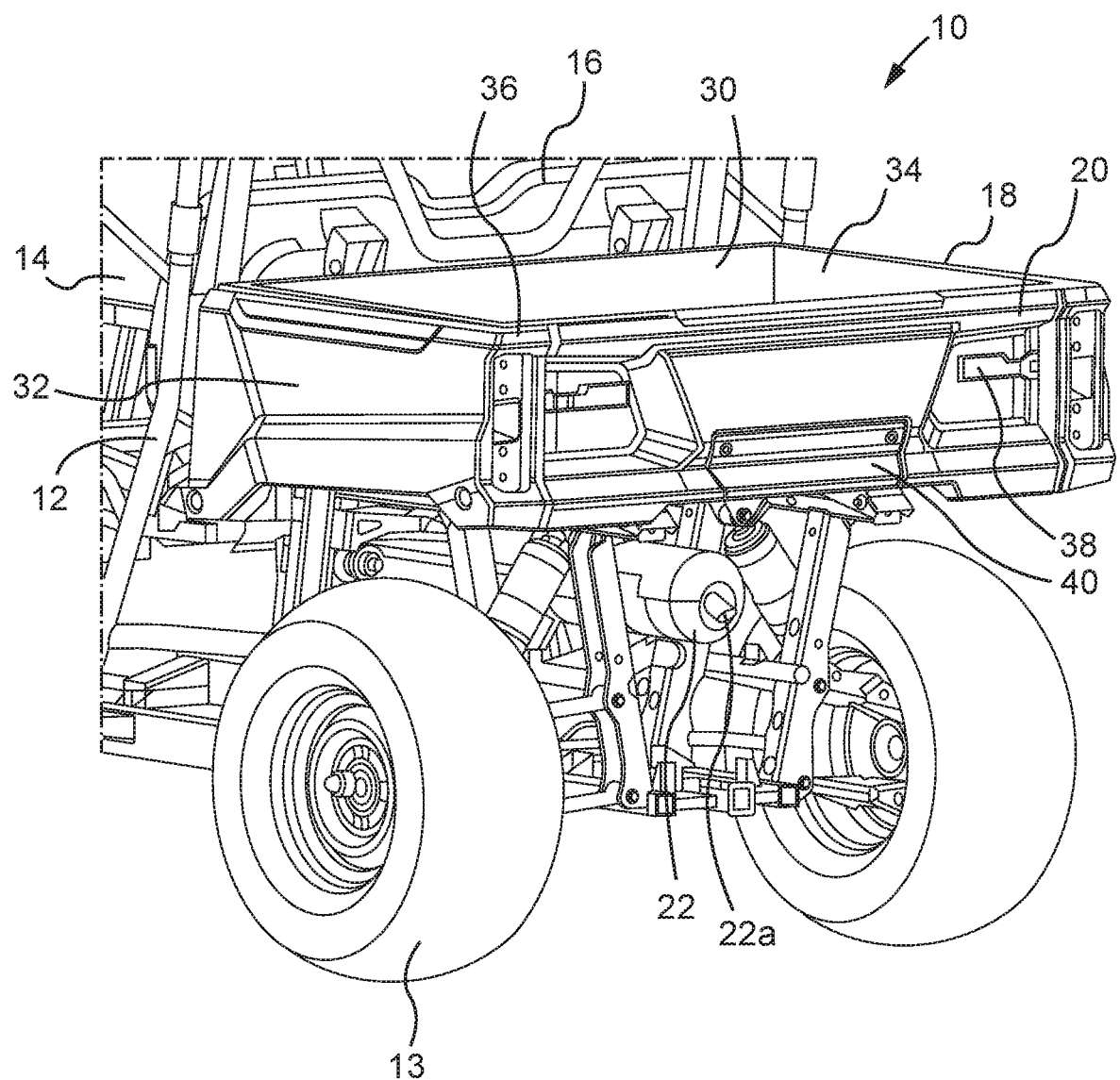
FIG. 1 is a rear perspective view of a utility vehicle with an exemplary embodiment of a tail gate with a heat shield according to the disclosure herein.
Figure 2:
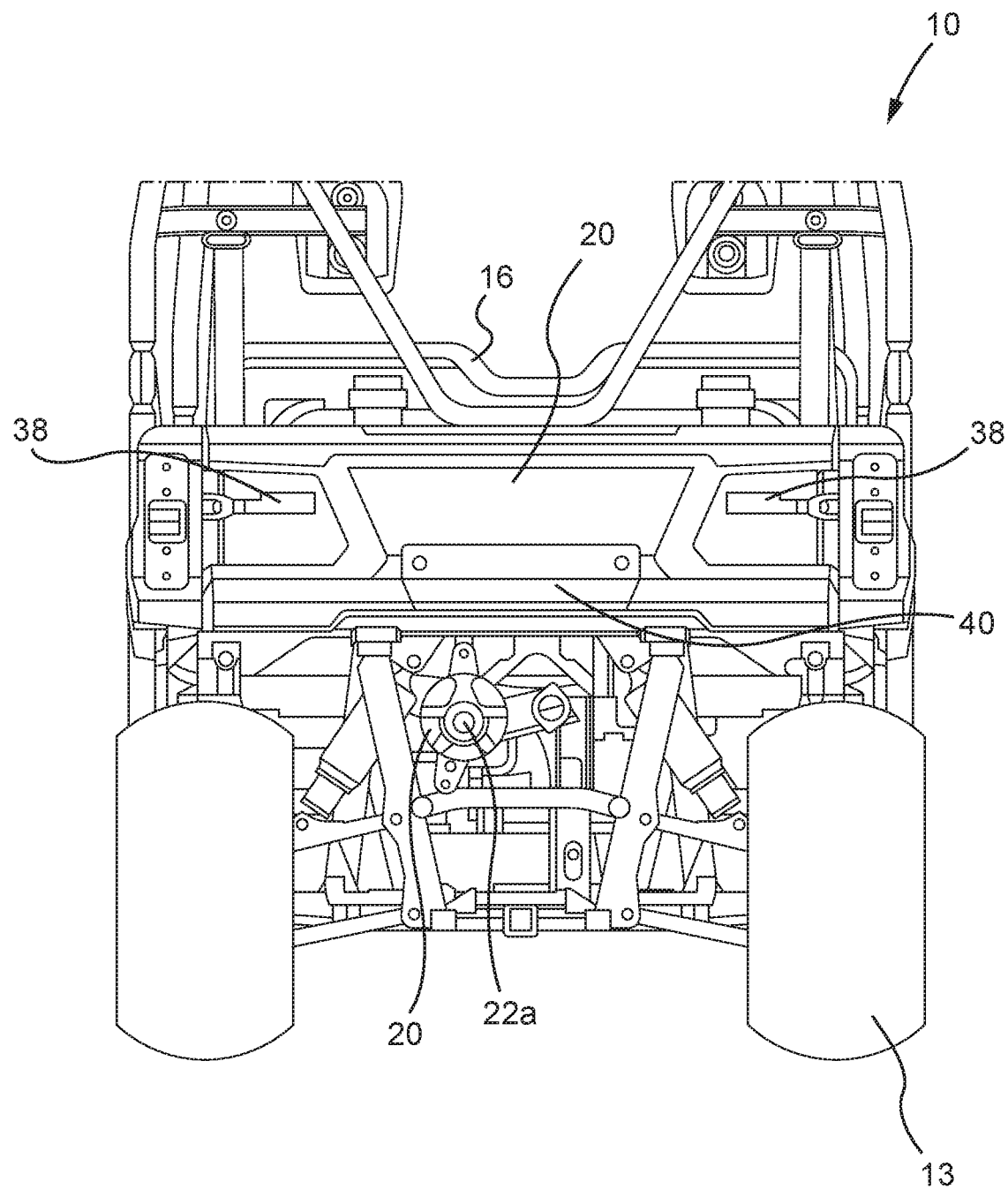
FIG. 2 is a rear elevational view of the utility vehicle shown in FIG. 1.

With reference to FIGS. 1 and 2, a utility vehicle according to an exemplary embodiment of the disclosure is shown generally by reference numeral 10. Utility vehicle 10 includes a body frame 12, a plurality of tires 13, a passenger area 14 having one or more seats 16, and a dump-type cargo bed 18 having a rear tail gate 20. The utility vehicle 10 is powered by an engine provided with an appropriate exhaust system including a muffler 22 and/or tailpipe 22a. Utility vehicles of this general nature are known in the art and a further description of the details thereof are therefore omitted.

Figure 5:
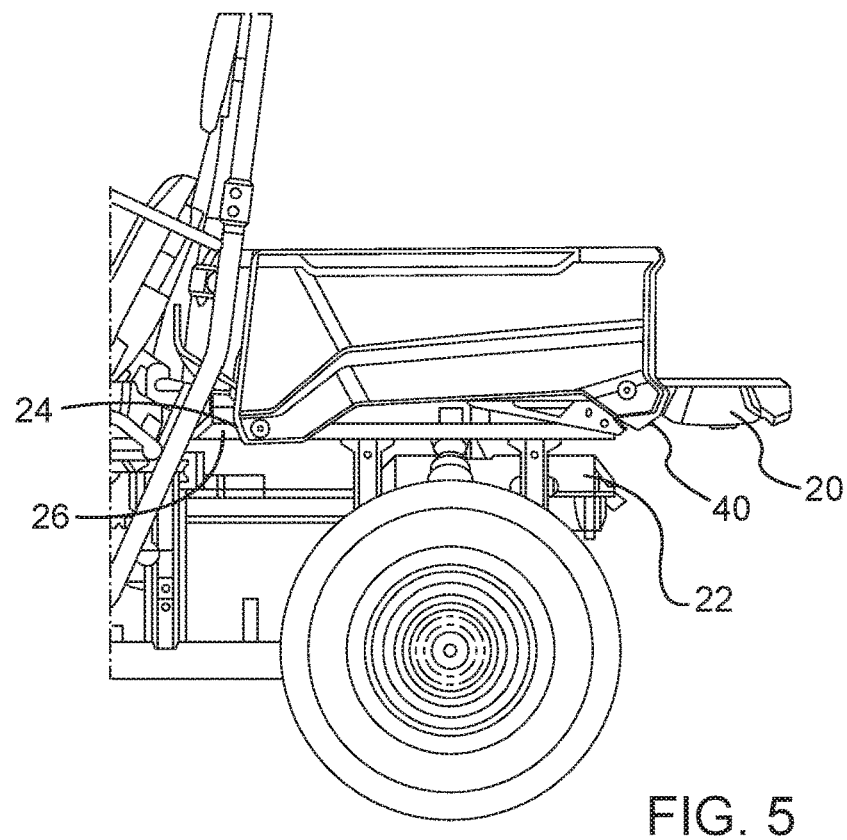
FIG. 5 is a side elevational view of the utility vehicle shown in FIG. 1 with the tail gate in an open position.
Figure 6:
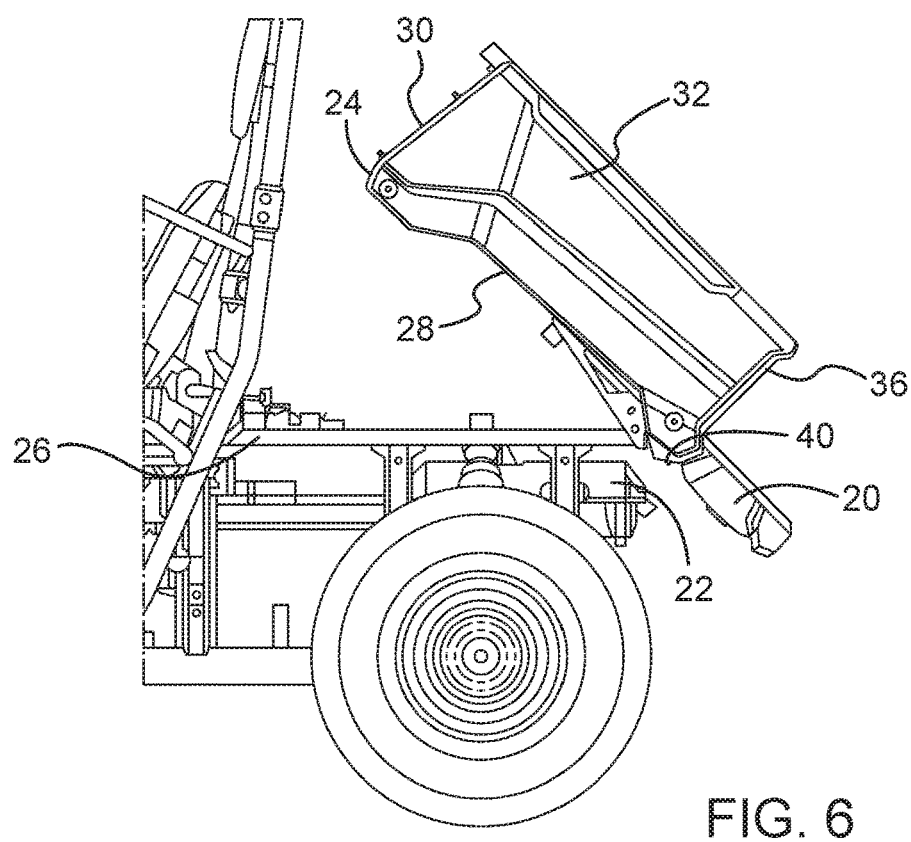
FIG. 6 is a side elevation view of the utility vehicle shown in FIG. 1 with the tail gate in an open position and the cargo bed in a dump position.

The cargo bed 18 includes a bottom surface 28 (see also FIG. 6), a front wall 30 adjacent the passenger area 14, left and right side walls 32, 34, and a rear wall 36. The walls are disposed substantially perpendicular and upward from the peripheral sides of the bottom surface 28. The rear wall 36 is substantially defined by the rear tail gate 20. Tail gate 20 is configured to be pivotally mounted on the vehicle 10, thereby having a closed position as shown in FIGS. 1 and 2, or an open position as shown in FIGS. 5 and 6. In the closed position, the tail gate 20 is substantially perpendicular to the bottom surface 28 of the cargo bed 18. In the open position, the tail gate 10 is positioned substantially aligned with a plane of the bottom surface 28 so as to facilitate easy loading and unloading of the cargo bed 18. The tail gate 20 includes manually releasable latches 38 that allow it to be opened or closed by the user. Other types of securing mechanisms known in the art, such as, for example, catch pins, cinch latch structures, and the like, can of course also be used to secure the tail gate in the closed position and release it to obtain the open position.

The cargo bed 18 can be formed from any known material or process as known in the art. The cargo bed 18 is configured so as to be movable about a rotation fulcrum between a normal position (as shown best in FIGS. 1 and 5) in which its front portion 24 is in a non-raised state and a tipped or dump position (as shown in FIG. 6) in which the front portion 24 is in a raised state relative to the support base 26 of the cargo bed 18. When in the normal position, the tail gate 20 can be in a closed position, as shown in FIG. 1, or in an open position as shown in FIG. 5. When in the dump position, it is advantageous to have the tail gate 20 in the open position in order to facilitate the contents of the cargo bed being emptied or dumped therefrom, as shown in FIG. 6.

Figure 7:
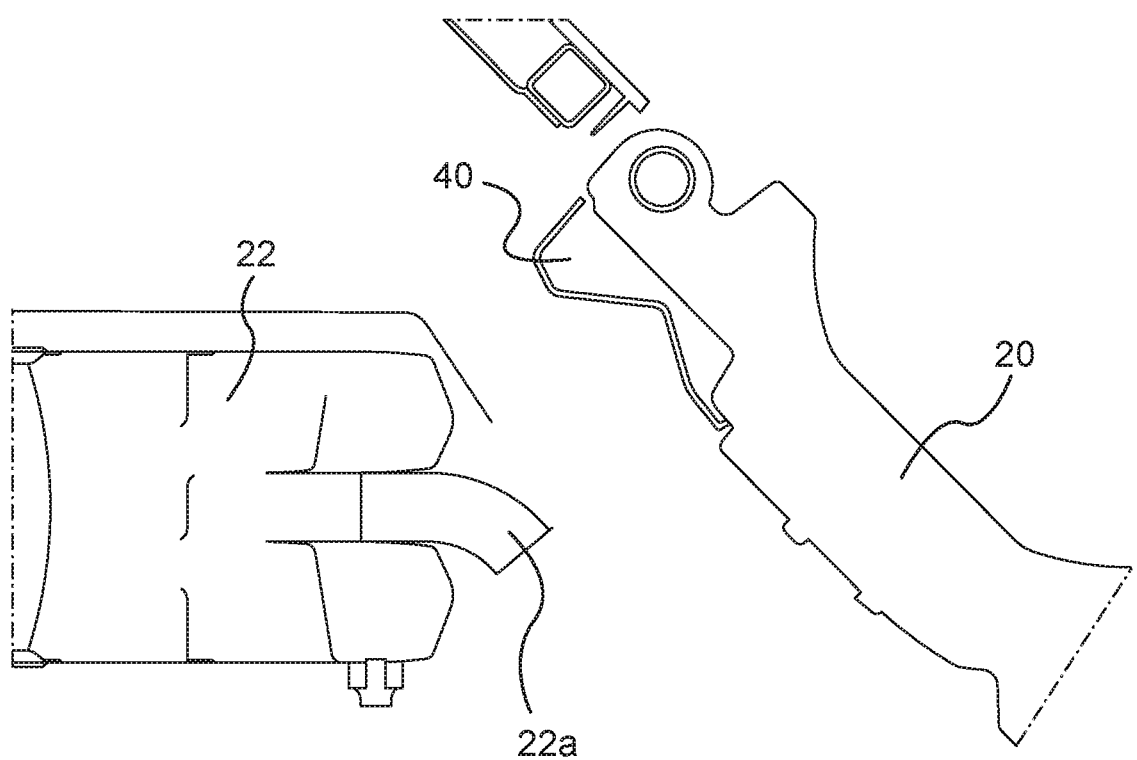
FIG. 7 is an enlarged schematic illustrating the tail gate in the open position when the cargo bed is in the dump position, as shown in FIG. 6.

As illustrated in FIGS. 6 and 7, the dump position with the tail gate 20 in the open position, places the tail gate 20 in close proximity to the exhaust system of the vehicle, i.e., the muffler 22 and/or tailpipe 22a. The tail gate 20 is formed by a material having a low melting point or temperature M1, such as, for example by blow molding high density polyethylene (HD-PE) which has a melting temperature of approximately 120° C.-180° C. Another possible material that could be used to form the tail gate 20 includes polypropylene, which also has a low melt temperature in the range of 160° C.-180° C. Further, the tail gate 20 can be formed by any plastic molding process or as an assembly from a plurality of molded plastic parts. Still further, the tail gate 20 could be formed from a metal material or a metal material with an outermost plastic covering over a portion of the metal material.

In order to prevent the high temperature of the muffler 22 and/or tailpipe 22a from melting or otherwise adversely affecting the cosmetic appearance or structural integrity of the tail gate 20, a thermal insulating plate or heat shield 40 is attached to the exterior surface of the tailgate 20 at a lower edge of the tailgate 20 in a position generally corresponding to where the muffler 22 and/or tailpipe 22a will be when the cargo bed 18 is in the dump position and the tail gate 20 is open (see FIGS. 6 and 7). As shown, a small gap exists between the muffler 22 and/or tailpipe 22a and the tail gate 20 and the heat shield 40 provides further thermal insulation to the tail gate 20 from the extreme heat of the muffler 22 and/or tailpipe 22a.

Figure 3:
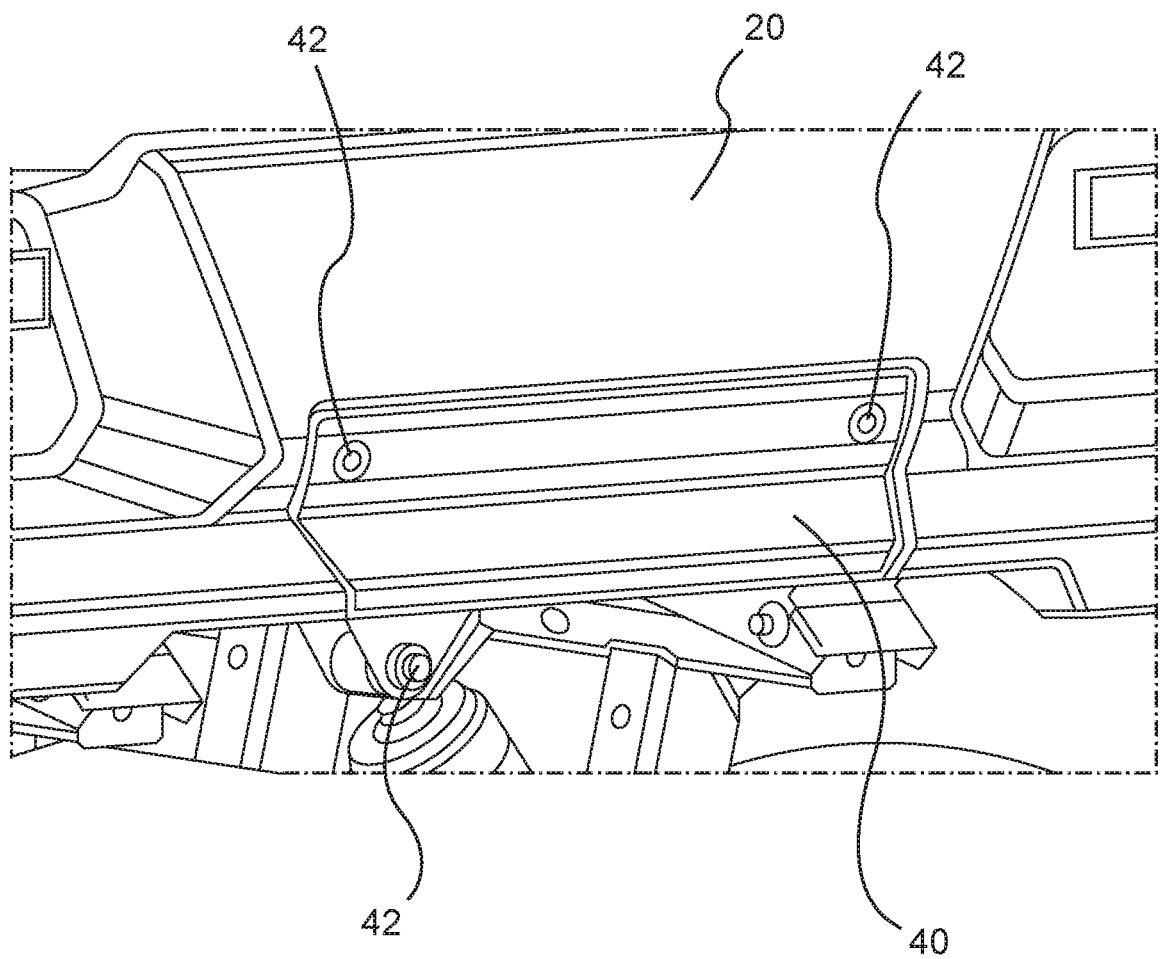
FIG. 3 is an enlarged view of the heat shield on the tail gate as shown in FIG. 1.
Figure 4:
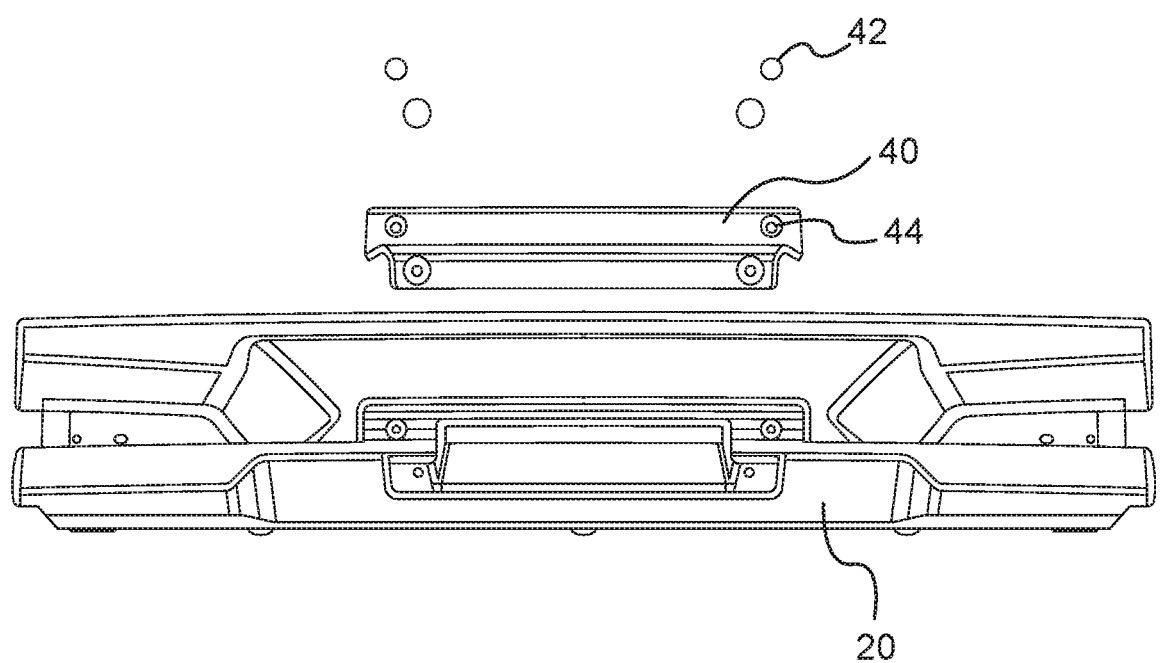
FIG. 4 is an exploded view illustrating the attachment of the heat shield to the tail gate in accordance with the disclosure herein.

The heat shield 40 has a substantially flat surface and is attached to the tail gate 20 by a plurality of fasteners 42 which extend through openings 44 formed in the heat shield 40. Fasteners 42 include mudguard clips, screws, bolts, or any type of fastener known in the art could be used as long as it withstands the high temperatures of the exhaust system. As illustrated, the dimensions of heat shield 40 are chosen so as to ensure the heat shield 40 will be proximal the muffler 22 and/or tail pipe 22a when the cargo bed is dumped and the tail gate 20 is open. The heat shield 40 can be larger or smaller as may be dictated by the specific implementation on any particular utility vehicle. In the exemplary embodiment illustrated, the tail gate 20 has a predetermined length between the opposing side walls 32, 34 and the heat shield 40 has a substantially shorter length and width. The heat shield 40 can also be decoratively styled or shaped to be incorporated into the styling of the tail gate 20 as illustrated best in FIG. 3. That is, the heat shield 40 has the same shape and configuration as the underlying tail gate 20.

The heat shield 40 can be formed by a material having a melting point or temperature M2 greater than the melting point or temperature M1 of the tail gate 20, such as, for example, molding a thermoplastic material, and more particularly, injection molding a polyamide (Nylon) material having a melting temperature of approximately 265° C. The heat shield 40 could also be formed from a metal material having a melt temperature greater than the melting temperature M1 of the outermost material of the tailgate 20 at the position generally corresponding to where the muffler 22 and/or tailpipe 22a will be when the cargo bed 18 is in the dump position and the tail gate 20 is open. Regardless, no matter what materials are selected for the tailgate 20 and the heat shield 40, the melting temperature M2 of the heat shield 40 is greater than the melting temperature M1 of the tail gate 20, at least at the position generally corresponding to where the muffler 22 and/or tailpipe 22a will be when the cargo bed 18 is in the dump position and the tail gate 20 is open, such that the heat shield 40 protects the body of the tail gate 20 from adverse effects of the vehicle exhaust system, i.e., to prevent the tail gate 20 from being damaged due to melting.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A tail gate for a vehicle cargo bed comprising:
   a tail gate body having an interior surface disposed towards the vehicle cargo bed and an exterior surface disposed outwards from the vehicle cargo bed, the tail gate body having a first side and a second side, an upper surface and a lower surface; and
   a heat shield secured to the exterior surface of the tail gate body;
   wherein the heat shield is disposed on a lower edge of the tail gate body;
   wherein at least a portion of an outermost exterior surface of the tail gate body is constructed from a first material comprising a plastic having a first melting temperature;
   wherein the heat shield is disposed over only a portion of the outermost exterior surface of the tail gate body and is constructed from a second material having a second melting temperature;
   wherein the second melting temperature is greater than the first melting temperature; and
   wherein the tail gate body has a first width defined between the first and second sides and a first height defined between the upper surface and the lower surface and the heat shield has a second width and a second height, the second width and the second height of the heat shield being less than the first width and the first height of the tail gate body.

2. The tail gate according to claim 1, wherein the first material comprises high density polyethylene.

3. The tail gate according to claim 1, wherein the second material comprises polyamide.

4. The tail gate according to claim 1, wherein the lower edge of the tail gate body has a predetermined shape and configuration and the heat shield has the same shape and configuration as the tailgate body to which it is secured.

5. The tail gate according to claim 1, wherein the heat shield includes a plurality of openings.

6. The tail gate according to claim 5, wherein the heat shield is secured to the tail gate body by a plurality of fasteners passing through said plurality of openings.

7. A tail gate configured for use on a dumping cargo bed of a utility vehicle, the utility vehicle having a body frame, a passenger area, and an exhaust system outlet, the dumping cargo bed configured to have a normal position and a dump position and the tail gate configured to have a closed position and an open position, the tail gate comprising:
 a tail gate body having an interior surface disposed towards the passenger area and an exterior surface disposed outwards from the dumping cargo bed, the tail gate body having a first side and a second side, an upper surface and a lower surface; and
 a heat shield disposed on the exterior surface of the tail gate body;
 wherein the tail gate body has a first width defined between the first and second sides and a first height defined between the upper surface and the lower surface, and the heat shield has a second width and a second height, the second width and the second height of the heat shield being less than the first width and the first height of the tail gate body;
 wherein, when the cargo bed is in the dump position and the tail gate is in the open position, a portion of the tail gate body is proximal the exhaust system outlet, the heat shield being disposed on only said portion of the tail gate body that is proximal to the exhaust system outlet.

8. The tail gate according to claim 7, wherein the portion of the tail gate body proximal to the exhaust system outlet is constructed from a first material having a first melting temperature and the heat shield is constructed from a second material having a second melting temperature.

9. The tail gate according to claim 8, wherein the second melting temperature is greater than the first melting temperature.

10. The tail gate according to claim 8, wherein the first material comprises high density polyethylene.

11. The tail gate according to claim 8, wherein the second material comprises polyamide.

12. The tail gate according to claim 7, wherein the heat shield is disposed on a lower edge of the tail gate body.

13. The tail gate according to claim 12, wherein the lower edge of the tail gate body has a predetermined shape and configuration and the heat shield has the same shape and configuration as the tailgate body to which it is secured.

14. The tail gate according to claim 7, wherein the heat shield includes a plurality of openings.

15. The tail gate according to claim 14, wherein the heat shield is secured to the tail gate body by a plurality of fasteners passing through said plurality of openings.

16. A dumping cargo bed for a utility vehicle comprising:
 a bottom surface;
 a front wall, a first side wall and a second opposing side wall, and a rear wall being disposed substantially perpendicular and upward from a periphery of the bottom surface;
 the rear wall comprising a tail gate having an interior surface disposed towards the front wall and an exterior surface disposed outwards from the dumping cargo bed; and
 a heat shield disposed on the exterior surface of the tail gate;
 wherein the dumping cargo bed is configured to have a normal position and a dump position and the tail gate is configured to have a closed position and an open position;
 wherein, when the dumping cargo bed is in the dump position and the tail gate is in the open position, only a predetermined portion of the tail gate is proximal an exhaust system component of the utility vehicle, the heat shield being disposed on only said predetermined portion of the tail gate that is proximal to the exhaust system component;
 wherein at least the predetermined of portion the tail gate is constructed from a first plastic material having a first melting temperature;
 wherein the heat shield is constructed from a second material having a second melting temperature; and
 wherein the second melting temperature is higher than the first melting temperature such that the heat shield provides an insulation barrier between the exhaust system component of the utility vehicle and the tailgate of the dumping cargo bed when the dumping cargo bed is in the dump position and the tailgate is in the open position.

17. The dumping cargo bed according to claim 16, wherein the second material comprises a metal material.

18. The dumping cargo bed according to claim 16, wherein the second material comprises a thermoplastic material.

19. The dumping cargo bed according to claim 16, wherein the heat shield is disposed on a lower portion of the tail gate, the tail gate having a first width defined between the first and second opposing side walls and the heat shield having a second width, the second width of the heat shield being less than the first width of the tail gate.

* * * * *